US006376602B1

(12) United States Patent
Probst et al.

(10) Patent No.: US 6,376,602 B1
(45) Date of Patent: *Apr. 23, 2002

(54) COATING COMPOSITIONS, A PROCESS FOR THEIR PRODUCTION AND THEIR USE FOR COATING WATER-RESISTANT SUBSTRATES

(75) Inventors: Joachim Probst; Werner Kubitza, both of Leverkusen; Rolf Roschu, Willich; Hans Josef Laas, Koeln, all of (DE)

(73) Assignee: Bayer Aktiengesellschaft, Leverkusen (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/432,560

(22) Filed: May 1, 1995

Related U.S. Application Data

(63) Continuation of application No. 08/225,032, filed on Apr. 8, 1994, now abandoned, which is a continuation of application No. 08/019,733, filed on Feb. 19, 1993.

(30) Foreign Application Priority Data

Feb. 27, 1992 (DE) ............................................ 42 06 044

(51) Int. Cl.⁷ .............................. C08J 3/00; C08K 3/20; C08L 75/00; C08F 8/30
(52) U.S. Cl. ....................... 524/591; 524/507; 524/839; 524/840; 525/123; 525/127; 525/455
(58) Field of Search ............................... 525/455, 123, 525/127; 524/591, 839, 840, 507

(56) References Cited

U.S. PATENT DOCUMENTS

| 4,186,118 A | 1/1980 | Reischl et al. ............. 260/29.2 |
| 4,663,377 A | 5/1987 | Hombach et al. ........... 524/196 |
| 4,711,918 A | 12/1987 | Kubitza et al. ............. 524/196 |
| 4,997,879 A | * 3/1991 | Weissgerber et al. ....... 524/823 |
| 5,075,370 A | 12/1991 | Kubitza et al. ............. 524/591 |
| 5,159,011 A | 10/1992 | Rau et al. .................... 524/562 |

FOREIGN PATENT DOCUMENTS

| CA | 2055419 | 5/1992 |
| EP | 310345 | 4/1989 |
| GB | 1097516 | 1/1968 |

OTHER PUBLICATIONS

Odian, G., Principles of Polymerization, 1981, pp. 319–320.*

* cited by examiner

*Primary Examiner*—Patrick D. Niland
(74) *Attorney, Agent, or Firm*—Joseph C. Gil; Thomas W. Roy

(57) ABSTRACT

The present invention relates to water-borne coating compositions wherein the binder contains a mixture of a) a polyol component dispersed in water or a water/solvent mixture which contains at least one polymer prepared from olefinically unsaturated monomers and having a molecular weight ($M_n$) of at least 500, at least two alcoholic hydroxyl groups per molecule, a hydroxyl value of 15 to 250 mg KOH/g, an acid value of 0 to 7 mg KOH/g and a total content of sulfonate and carboxylate groups of 0 to 4.5 milliquivalents per 100 g of solid resin and b) a polyisocyanate component which is emulsified in the dispersion of polyol component a), has a viscosity at 23° C. of 50 to 10,000 mPa.s and an average NCO functionality of 1.8 to 4.2, and contains 12.0 to 21.5% by weight of (cyclo)aliphatically bound isocyanate groups and, optionally, 2 to 20% by weight of ethylene oxide units present within polyether chains, the polyether chains containing a statistical average of 5 to 70 ethylene oxide units, wherein the components are present in quantities corresponding to an equivalent ratio of isocyanate groups of component b) to alcoholic hydroxyl groups of component a) of 0.2:1 to 5:1. The present invention also relates to a process for the production of these coating compositions and to coated water-resistant substrates prepared from these coating compositions.

9 Claims, No Drawings

US 6,376,602 B1

COATING COMPOSITIONS, A PROCESS FOR THEIR PRODUCTION AND THEIR USE FOR COATING WATER-RESISTANT SUBSTRATES

This application is a continuation of application Ser. No. 08/225,032 filed Apr. 8, 1994 now abandoned which is a continuation of Ser. No. 08/019,733 filed Feb. 19, 1993.

BACKGROUND OF THE INVENTION

1. Field of the Invention

The present invention relates to new water-borne, two-component polyurethane coating compositions based on selected polyhydroxyl compounds dispersed in aqueous medium and polyisocyanates emulsified in these dispersions, to a process for the production of these coating compositions by emulsification of the polyisocyanate component in the dispersion and to the use of the coating compositions for the production of coatings on water-resistant substrates.

2. Description of the Prior Art

Ecological factors play an important part in surface technology. A particularly urgent problem is reducing the quantities of organic solvents used in coating compositions.

Until recently it had not been possible to dispense with organic solvents in chemically crosslinking polyurethane coating compositions, which have acquired considerable significance in the coating field due to their outstanding properties. The use of water instead of organic solvents in these two-component polyurethane coating compositions wherein the polyisocyanate component contained free isocyanate groups did not appear possible because it is known that isocyanate groups react not only with alcoholic hydroxyl groups, but also with water. Because the concentration of active hydrogen atoms emanating from water in these systems is substantially greater than the concentration of hydroxyl groups from the organic NCO-reactive component, it had to be assumed that in the ternary polyisocyanate/organic polyhydroxyl compound/water system a reaction would take place between the isocyanate groups and water to form urea and carbon dioxide. Instead of the desired crosslinking reaction between the polyisocyanate and the organic polyhydroxyl compounds, it was expected that the isocyanate groups would react with water resulting in foam formation through the generation of carbon dioxide.

It is already known from DE-OS 2,708,442 and from DE-OS 3,529,249 that organic polyisocyanates may be added to aqueous polymer dispersions to improve their property spectrum. However, the polymers disclosed therein are not the organic polyhydroxyl compounds typically used as reactants for polyisocyanates. In addition, the effect of adding polyisocyanates to aqueous polymer dispersions described in these prior publications is presumably attributable to coating the dispersed polymer with the urea formed from the reaction between the polyisocyanate and water.

It was only from European Patent Application EP-A-0,358,979 that it became known that selected polyhydroxyl compounds based on vinyl polymers could be used as reactants for organic polyisocyanates containing free isocyanate groups for the production of water-borne, two-component polyurethane systems by emulsification of the polyisocyanates containing free isocyanate groups in the aqueous polymer solution or dispersion.

The polyhydroxyl compounds described in EP-A-0,358,979 are preferably prepared by free radical polymerization and have an acid value (based on the non-neutralized sulfonic acid and/or carboxyl groups) of 0 to 150, preferably 0 to 100 mg KOH/g solid resin; and a content of sulfonate and/or carboxylate groups of 5 to 417, preferably 24 to 278 milliequivalents per 100 g solids.

It has now been surprisingly found that even when vinyl polymer polyols containing less than 5 milliequivalents of sulfonate and/or carboxylate groups per 100 g of solid resin are used, it is possible to obtain two-component polyurethane coating compositions having very good properties, including long pot lives and high solvent resistance.

SUMMARY OF THE INVENTION

The present invention relates to water-borne coating compositions wherein the binder contains a mixture of a) a polyol component dispersed in water or a water/solvent mixture which contains at least one polymer prepared from olefinically unsaturated monomers and having a molecular weight ($M_n$) of at least 500, at least two alcoholic hydroxyl groups per molecule, a hydroxyl value of 15 to 250 mg KOH/g, an acid value of 0 to 7 mg KOH/g and a total content of sulfonate and carboxylate groups of 0 to 4.5 milliquivalents per 100 g of solid resin and b) a polyisocyanate component which is emulsified in the dispersion of polyol component a), has a viscosity at 23° C. of 50 to 10,000 mPa.s and an average NCO functionality of 1.8 to 4.2, and contains 12.0 to 21.5% by weight of (cyclo)aliphatically bound isocyanate groups and, optionally, 2 to 20% by weight of ethylene oxide units present within polyether chains, the polyether chains containing a statistical average of 5 to 70 ethylene oxide units, wherein the components are present in quantities corresponding to an equivalent ratio of isocyanate groups of component b) to alcoholic hydroxyl groups of component a) of 0.2:1 to 5:1.

The present invention also relates to a process for the production of these coating compositions by emulsifying the polyisocyanate component in an aqueous or aqueous/organic dispersion of the polyol component in amounts corresponding to an equivalent ratio of isocyanate groups to alcoholic hydroxyl groups of 0.2:1 to 5:1 and, prior to the addition of the polyisocyanate, incorporating any auxiliaries and additives into the polyol component.

Finally, the present invention relates to coated water-resistant substrates prepared from these coating compositions.

DETAILED DESCRIPTION OF THE INVENTION

The polyol component is selected from polymer resins prepared from olefinically unsaturated monomers which have a molecular weight ($M_n$, as determined by gel permeation chromatography) of at least 500, preferably 500 to 100,000 and more preferably 1000 to 50,000; an average of at least two alcoholic hydroxyl groups per molecule; a hydroxyl value of 15 to 250, preferably 30 to 150, mg KOH/g solids; an acid value (based on unneutralized sulfonic acid and carboxyl groups) of 0 to 7, preferably 0, mg KOH/g solid resin; and a total content of sulfonate and carboxylate groups of 0 to 4.5, preferably 0, milliequivalents per 100 g of solid resin.

The dispersions a) generally contain 10 to 50% by weight, preferably 20 to 40% by weight, of the polyol component as the dispersed phase. The continuous aqueous phase may contain up to 20% by weight, based on the weight of the continuous phase, of the organic solvents to be described hereinafter. Accordingly, the continuous phase of the dispersions is primarily water. The dispersions generally have a viscosity at 23° C. of 10 to 10,000, preferably 100 to 10,000 mPa.s; and a pH of 5 to 10, preferably 6 to 9.

The dispersibility of the polymer resins is based on the presence of the emulsifiers to be described hereinafter. In addition, in a less preferred embodiment, component a) may contain up to 10% by weight, based on the weight of the polyol component, of water-soluble polyhydric alcohols having a molecular weight of 62 to 499, preferably 62 to 200, which are different from the solvents to be described hereinafter. Examples of these alcohols include ethylene glycol, propylene glycol, glycerol, trimethylol propane and the low molecular weight, water-soluble alkoxylation products of these polyhydric alcohols.

The polyol component is produced by known radical polymerization methods, for example, solution polymerization, emulsion polymerization and suspension polymerization. They are preferably produced by radical emulsion polymerization in aqueous medium.

Continuous or discontinuous polymerization processes may be applied. Of the discontinuous processes, the batch process and the inflow process may be used; the inflow process is preferred. In the inflow process, water is initially introduced either alone or with a portion of the anionic emulsifier, an optional nonionic emulsifier and a portion of the monomer mixture, and heated to the polymerization temperature. After introduction of a portion of the monomers the polymerization reaction is radically initiated. The remainder of the monomer mixture is added together with the remainder of the initiator mixture and the emulsifier over a period of 1 to 10 hours, preferably 3 to 6 hours. If necessary, more activator may then be added to enable the polymerization to be continued to a conversion of at least 99%.

The emulsifiers used are anionic and/or nonionic emulsifiers. Preferred anionic emulsifiers are those containing carboxylate groups, sulfate groups, sulfonate groups, phosphate groups or phosphonate groups. Emulsifiers containing sulfate, sulfonate, phosphate or phosphonate groups are preferred. The emulsifiers may have low or high molecular weights. High molecular weight emulsifiers are described, for example, in DE-OS 3,806,066 and in DE-AS 1,953,349.

Preferred anionic emulsifiers are synthesized from long-chain alcohols or substituted phenols and a monohydroxy polyether containing ethylene oxide units and having a degree of polymerization of 2 to 100, wherein the polyether chain also contains a sulfuric acid or phosphoric acid group attached in the form of an ester unit. Preferred neutralizing agents for the unesterified acid groups are ammonia or amines. The emulsifiers may be added to the emulsion individually or in admixture.

Suitable nonionic emulsifiers, which may be used in combination with the anionic emulsifiers, are reaction products of aliphatic, araliphatic, cycloaliphatic or aromatic carboxylic acids, alcohols, phenol derivatives or amines with epoxides, such as ethylene oxide. Examples are reaction products of ethylene oxide with carboxylic acids of castor oil or abietic acid; relatively long-chain alcohols such as oleyl alcohol, lauryl alcohol and stearyl alcohol; phenol derivatives such as substituted benzyl, phenyl and nonylphenols; and relatively long-chain amines such as dodecyl amine and stearyl amine. The reaction products with ethylene oxide are oligoethers and polyethers having degrees of polymerization of 2 to 100, preferably 5 to 50.

The emulsifiers are added in quantities of 0.1 to 10% by weight, based on the mixture of monomers. Suitable co-solvents, which may optionally be used, are both water-soluble and water-insoluble solvents, e.g., aromatic hydrocarbons such as benzene, toluene, xylene and chlorobenzene; esters such as ethyl acetate, butyl acetate, methyl glycol acetate, ethyl glycol acetate and methoxypropyl acetate; ethers such as butyl glycol, tetrahydrofuran, dioxane, ethyl glycol ether and ethers of diglycol; ketones such as acetone, methy ethyl ketone and methyl isobutyl ketone; trichloromonofluoroethane; and cyclic amides such as N-methyl pyrrolidone and N-methyl caprolactam.

The radically initiated polymerization may be initiated by water-soluble or water-insoluble initiators or initiator mixtures having radical dissociation half lives at temperatures of 10 to 100° C. of 0.01 to 400 minutes.

In general, the polymerization reaction takes place in aqueous emulsion at a temperature of 10 to 100° C., preferably 30 to 90° C., under a pressure of 1000 to 20,000 mbar. The actual polymerization temperature is determined by initiator used. The initiators are used in quantities of 0.05 to 6% by weight, based on the total quantity of monomers.

Suitable monomers include hydroxy-functional monomers, acidic monomers and monomers which do not contain either hydroxyl or acidic groups. These monomers are disclosed in EP-A-0,358,979 (U.S. Pat. No. 5,075,370, which is herein incorporated by reference). Acidic monomers, i.e., monomers containing carboxyl and/or sulfonic acid groups, are only used in the small quantities previously set forth and preferably are not used at all.

Suitable initiators include water-soluble and water-insoluble azo compounds such as azoisobutyrodinitrile and 4,4'-azo-bis-(4-cyanopentanoic acid); inorganic and organic peroxides such as dibenzoyl peroxide, t-butyl perpivalate, t-butyl per-2-ethylhexanoate, t-butyl perbenzoate, t-butyl hydroperoxide, di-t-butyl peroxide, cumene hydroperoxide, dicyclohexyl and dibenzyl peroxydicarbonate, and the sodium, potassium or ammonium salts of peroxodisulfuric acid and hydrogen peroxide. The peroxodisulfates and hydrogen peroxides are often used in combination with reducing agents such as the sodium salt of formamidine sulfinic acid (Rongalit C), ascorbic acid or polyalkylene polyamines. A reduction in the polymerization temperature is generally obtained in this way.

The molecular weight of the polymers may be regulated by the use of typical regulators such as n-dodecyl mercaptan, t-dodecyl mercaptan, diisopropyl xanthogene disulfide, di(methylenetrimethylolpropane) xanthogene disulfide and thioglycol. They are used in quantities of at most 3% by weight, based on the monomer mixture.

After the polymerization reaction is complete, neutralizing agents are optionally added to the polymers present in aqueous dispersion to provide a degree of neutralization of 30 to 100%, preferably 50 to 100%.

Inorganic bases, ammonia or amines may be used as neutralizing agents. Suitable inorganic bases include sodium hydroxide and potassium hydroxide. In addition to ammonia, suitable amines include trimethyl amine, triethyl amine, dimethyl ethanolamine, methyl diethanolamine, triethanolamine, etc. The neutralizing agents may be used both in less than and greater than equivalent quantities. After neutralization the polymers have the previously mentioned acid numbers and contents of sulfonate and carboxylate groups, preferably carboxylate groups.

In cases where the acidic groups optionally present are completely neutralized, the acid value is zero while the content of sulfonate and/or carboxylate groups corresponds to the original content of sulfonic acid groups or carboxyl groups. If the acidic groups are partially neutralized, the content of sulfonate and/or carboxylate groups corresponds to the quantity of neutralizing agent used. The aqueous dispersions obtained have the above-mentioned concentrations and viscosities. Any co-solvents added may remain in the aqueous dispersion in the quantities mentioned above or may even be removed by distillation on completion of the polymerization reaction.

Polyisocyanates suitable as crosslinking component b) include polyisocyanate mixtures having a) an average NCO functionality of 1.8 to 4.2,
b) a content of (cyclo)aliphatically bound isocianate groups (expressed as NCO, molecular weight=42) of 12.0 to 21.5% by weight and, preferably,
c) a content of ethylene oxide units present within polyether chains (expressed as $C_2H_4O$, molecular weight=44) of 2 to 20% by weight, the polyether chains containing on an average of 5 to 70 ethylene oxide units.

These preferred polyisocyanate mixtures are prepared in known manner by the reaction of a polyisocyanate component A) having an (average) NCO functionality of 2.1 to 4.4, preferably 2.3 to 4.3, and containing one or more polyisocyanates having only (cyclo)aliphatically bound isocyanate groups with a monofunctional or polyfunctional polyalkylene oxide polyether alcohol B) containing an average of 5 to 70 ethylene oxide units, an NCO:OH equivalent ratio of least 2:1 and generally from 4:1 to approx. 100:1 being maintained during the reaction. In addition, the type of and quantitative ratios between the starting components mentioned are selected so that the reaction products obtained comply with the conditions mentioned above under a) to c).

The polyisocyanates or polyisocyanate mixtures A) are polyisocyanate derivatives containing uretdione, isocyanurate, urethane, allophanate, biuret and/or oxadiazine trione groups prepared from monomeric (cyclo)aliphatic diisocyanates. Processes for the preparation of the polyisocyanate derivatives are described in DE-OSS 1,670,666, 3,700,209 and 3,900,053 or in EP-A 336,205 and 339,396.

Suitable (cyclo)aliphatic diisocyanates for the production of the polyisocyanates derivatives are those having a molecular weight of 140 to 400 such as 1,4-diisocyanatobutane, 1,6-diiso-cyanatohexane, 1,5-diisocyanato-2,2-dimethyl pentane, 2,2,4-and 2,4,4-trimethyl-1,6-diisocyanatohexane, 1,10-diisocyanatodecane, 1,3- and 1,4-diisocyanatocyclohexane, 1-isocyanato-3,3,5-trimethyl-5-isocyanatomethyl cyclohexane (isophorone diisocyanate), 4,4'-diisocyanatodicyclohexyl methane and mixtures of these diisocyanates.

Preferred starting components for the preparation of the hydrophilically-modified polyisocyanates are polyisocyanate mixtures having an NCO content of 1 g to 24% by weight and containing the isocyanurate trimer 1,6-diisocyanatohexane and the isocyanurate dimer of 1,6-diisocyanatohexane. Another preferred starting component is a polyisocyanate having an NCO content of 1 g to 24% by weight which contains the isocyanurate trimer 1,6-diisocyanatohexane but does not contain the uretdione dimer. This polyisocyanate preferably has an average NCO functionality of 3.2 to 4.2.

Monohydric or polyhydric polyalkylene oxide polyether alcohols B) contain an average of 5 to 70, preferably 6 to 60, ethylene oxide units per molecule and may be obtained in known manner by the alkoxylation of suitable starter molecules.

Monohydric or polyhydric alcohols having a molecular weight of 32 to 150, for example those disclosed in EP-A 206,059 (U.S. Pat. No. 4,663,377, herein incorporated by reference), may be used as starter molecules for the production of the polyether alcohols B). Monohydric aliphatic alcohols containing 1 to 4 carbon atoms are preferably used as starter molecules. Methanol is particularly preferred.

Alkylene oxides suitable for the alkoxylation reaction are ethylene oxide and optionally other oxides such as propylene oxide. When mixtures of oxides are used they may be added sequentially and/or in admixture during the alkoxylation reaction. Accordingly, the polyalkylene oxide polyether alcohols B) are either pure polyethylene oxide polyethers or mixed polyalkylene oxide polyethers which contain at least one polyether chain containing at least 5, preferably 5 to 70, more preferably 6 to 60 and most preferably 7 to 20, ethylene oxide units; and in which at least 60 mole %, preferably at least 70 mole %, of the alkylene oxide units are ethylene oxide units.

Preferred polyether alcohols B) for the production of the water-emulsifiable polyisocyanate mixtures are monofunctional polyalkylene oxide polyethers started with an aliphatic $C_{1-4}$ alcohol and containing an average of 6 to 60 ethylene oxide units. Particularly preferred polyether alcohols B) are pure polyethylene glycol monomethyl ether alcohols containing an average of 7 to 20 ethylene oxide units.

Instead of the preferred nonionically/hydrophilically modified polyisocyanates described above, unmodified polyisocyanates A) may also be used as component b) or a portion of component b), provided that the polyisocyanates are used in combination with suitable emulsifiers. Examples include the emulsifiers described, for example, in EP-A 0 013 112 for providing hydrophilicity to aromatic polyisocyanates, or the emulsifiers previously disclosed herein to be used with polyol component a). The emulsifiers are present in sufficiently large quantities to ensure the dispersibility of the hydrophobic polyisocyanates in the system.

It is also possible in principle, although less preferred, to also use anionically/hydrophilically modified polyisocyanates b). These polyisocyanates may be prepared by reacting polyisocyanate derivatives A) with less than equivalent quantities of dimethylol propionic acid and subsequently neutralizing the carboxyl group with tertiary amines.

Finally, water-emulsifiable aromatic polyisocyanate mixtures such as those described in GB-PS 1,444,933, in DE-OS 2,921,681 and in EP-A-61,628 are also suitable, but less preferred, as crosslinking component b).

To produce the ready-to-use coating composition, polyisocyanate component b) is emulsified in the aqueous dispersion of polyol component a). Mixing may also be carried out simply by stirring at room temperature.

The quantity in which the polyisocyanate component is used is selected to provide an NCO:OH equivalent ratio, based on the isocyanate groups of component b) and the alcoholic hydroxyl groups of component a), including the hydroxyl groups of any water-soluble, low molecular weight polyhydroxyl compounds used, of 0.2:1 to 5:1, preferably 0.5:1 to 2:1. Before the addition of polyisocyanate component b), the known auxiliaries and additives used in coatings technology may be incorporated in polyol component a). The auxiliaries and additives include foam inhibitors, flow control agents, thickeners, pigments, dispersion aids for the dispersion of pigments, etc.

The coating compositions according to the invention obtained as described above are suitable for virtually any applications where solvent-containing, solvent-free or other water-borne paint and coating systems having superior property profiles are presently used. Examples include the coating of any mineral building materials, such as lime- and/or cement-bonded plasters, gypsum-containing surfaces, fiber cement building materials and concrete; painting and sealing of wood and wood materials, such as chipboard, fiber board and paper; painting and coating of metallic surfaces; coating and painting of asphalt- and bitumen-containing pavements; paint and sealing of various plastic surfaces; and coating of leather and textiles. They are also suitable for surface-to-surface bonding of various materials and may be used for bonding the same or different materials to one another.

After it has been applied to the particular substrate, the two-component system may be cured or crosslinked at a temperature of 0 to 300° C., preferably at a temperature of room temperature to 200° C.

In the following examples, all parts and percentages are by weight unless otherwise indicated.

EXAMPLES

Starting Materials

Polyisocyanate 1

0,08 equivalents of a methanol-started, monofunctional polyethylene oxide polyether having an average molecular weight of 350 were added with stirring at room temperature to 1.0 equivalent of an isocyanurate-modified polyisocyanate prepared from 1,6-diisocyanatohexane (HDI) and having an NCO content of 21.5%, an average NCO functionality of approx. 3.8 and a viscosity of 3000 mPa.s (23° C.). The mixture was heated for 3 h to 100° C. After cooling to room temperature, a substantially colorless, clear polyisocyanate mixture was obtained which had an NCO content of 17.3%, a content of ethylene oxide units of 11.3% and a viscosity of 3050 mPa.s (23° C.).

Polymer Dispersion 1

In a 3 liter stirred autoclave equipped with a reflux condenser, stirrer and a gas inlet and outlet, 25 g of an anionic emulsifier (ammonium salt of a monosulfuric acid ester of an adduct of lauryl alcohol and ethylene oxide at a molar ratio of 1:3) and 600 g of deionized water were initially introduced and purged with nitrogen. While nitrogen was passed over the mixture in a steady stream, the contents of the autoclave were heated with stirring at approx. 200 rpm to a temperature of 80° C. A mixture of 34 g of hydroxypropyl methacrylate (adduct of propylene oxide and methacrylic acid), 40 g of n-butyl acrylate, 23 g of methyl methacrylate and 1 g of t-dodecyl mercaptan and a solution of 0.3 g of ammonium peroxodisulfate in 20 g of deionized water were then rapidly introduced. After a reaction time of 30 minutes, a mixture of 305 g of hydroxy-propyl methacrylate, 360 g of n-butyl acrylate, 208 g of methyl methacrylate and 9 g of t-dodecyl mercaptan and a solution of 3 g of ammonium peroxodisulfate in 850 g of deionized water were uniformly introduced over a period of 4 hours. After another 2 hours, a solution of 1 g of ammonium peroxodisulfate in 10 g of deionized water was added for post activation and polymerization was completed over a period of 4 hours.

The pH was adjusted to a value of 7.4 with approx. 6 ml of 25% aqueous ammonia. The contents of the autoclave were then degassed under a reduced pressure of 200 to 400 mbar and residual monomers were removed. The quantity of aqueous distillate removed was replaced by fresh deionized water. The polymer dispersion was then cooled to room temperature and filtered. No significant filter residue was observed. The polymer dispersion had the following properties:

| | |
|---|---|
| Concentration: | 40.4% by weight |
| Viscosity at 23° C.: | <100 mPa · s |
| Mean particle diameter: (as measured by laser correlation spectroscopy) | 201 ± 2 nm |
| OH number of the dispersed polymer resin (calculated): | 132 mg KOH/g solids |

Polymer Dispersion 2

25 g of of the same anionic emulsifier described in Example 1 in 820 g of deionized water were introduced into the same reactor used for the production of polymer dispersion 1 and heated with stirring under nitrogen to 80° C. A monomer mixture of 169 g of hydroxypropyl methacrylate (adduct of propylene oxide and methacrylic acid), 400 g of n-butyl acrylate, 401 g of methyl methacrylate and 10 g of t-dodecyl mercaptan and an initiator solution of 15 g of 35% aqueous hydrogen peroxide in 640 g of deionized water were then uniformly added over a period of 6 hours. After stirring for 2 hours, an initiator solution of 1 g of 35% aqueous hydrogen peroxide in 10 g of water was then added for post activation and polymerization was completed over a period of 4 hours. The pH was then adjusted to a value of 8.0 with approx. 4 ml of a 25% aqueous ammonia solution.

The polymerization mixture was then degassed under a residual pressure of 200 to 400 mbar and residual monomers were removed. The quantity of aqueous distillate removed was replaced by fresh deionized water. The polymer dispersion was then cooled to room temperature and filtered. The polymer dispersion had the following properties:

| | |
|---|---|
| Concentration: | 40.9% by weight |
| Viscosity at 23° C.: | <100 mPa · s |
| Mean particle diameter: (as measured by laser correlation spectroscopy) | 130 ± 2 nm |
| OH number of the dispersed polymer resin (calculated): | 66 mg KOH/g solids |

Example 1

100 parts by weight of polymer dispersion 1 were mixed with 4.04 parts by weight of a 5.0% by weight aqueous solution of a commercially available polyurethane thickener (Acrysol RFM 8, a product of Rohm and Haas, Frankfurt) and 0.2 part by weight of a commercially available foam inhibitor (Bevaloid 581 B, a product of Erbslöh, Düsseldorf). 104.2 parts by weight of a substantially indefinitely storable polyol component for a water-dilutable two-component polyurethane clear coating composition were obtained. The addition of 34.8 parts by weight of Polyisocyanate 1 resulted in a water-dilutable, two-component clear polyurethane coating composition having the following composition:

| | |
|---|---|
| Polyol, 100% | 40.4 parts by weight = 29.06% by weight |
| Thickener, 100% | 0.2 part by weight = 0.14% by weight |
| Foam inhibitor | 0.2 part by weight = 0.14% by weight |
| Polyisocyanate 100% | 34.8 parts by weight = 25.04% by weight |
| Solids content | 75.6 parts by weight = 54.38% by weight |
| Water | 63.4 parts by weight = 45.62% by weight |
| Total | 139.0 parts by weight = 100.00% by weight |

The coating composition did not contain any organic solvent. The equivalent ratio of NCO to OH groups was 1.5:1.

After application to glass plates in a wet film thickness of 120 to 240 μm (which corresponds to a dry film thickness of 40 to 70 μm), the coating dried in 24 hours to form a homogeneous, transparent, tough and hard film. After final curing (which took about 14 days at room temperature), the film had the following properties:

| | |
|---|---|
| Appearance (transparency/gloss) | Very good |
| Solvent resistance: | |
| White spirit: | Very good |
| Solvent naphtha 100: | Very good |
| Methoxypropyl acetate: | Very good |
| Acetone: | Moderate |
| Ethanol: | Good to moderate |
| Pendulum hardness (Albert/König): | 100–110 secs. |

When the coating composition was cured by stoving for 1 hour at 140° C., instead of curing at room temperature, the following properties were obtained:

| | |
|---|---|
| Appearance | Very good |
| Solvent resistance: | |
| White spirit: | Very good |
| Solvent naphtha 100: | Very good |
| Methoxypropyl acetate: | Very good |
| Acetone: | Moderate |
| Ethanol: | Good to moderate |
| Pendulum hardness: | 130–140 secs. |

Example 2

100 parts by weight of polymer dispersion 2 were mixed with 4.09 parts by weight of a 5.0% by weight solution of a commercially available polyurethane thickener (Acrysol RM 8, a product of Rohm and Haas, Frankfurt) and 0.2 parts by weight of a commercially available foam inhibitor (Bevaloid 581 B, a product of Erbslöh, Düsseldorf). 104.29 parts by weight of a substantially indefinitely storable polyol component for a water-dilutable two-component polyurethane clear coating composition were obtained. The addition of 17.6 parts by weight of Polyisocyanate 1 resulted in a water-dilutable, two-component clear polyurethane coating composition having the following composition:

| | |
|---|---|
| Polyol, 100% | 40.9 parts by weight = 33.55% by weight |
| Thickener, 100% | 0.2 part by weight = 0.16% by weight |
| Foam inhibitor | 0.2 part by weight = 0.16% by weight |
| Polyisocyanate 100% | 17.6 parts by weight = 14.44% by weight |
| Solids content | 58.9 parts by weight = 48.32% by weight |
| Water | 63.0 parts by weight = 51.68% by weight |
| Total | 121.9 parts by weight = 100.00% by weight |

The coating composition did not contain any organic solvent. The equivalent ratio of NCO to OH groups was 1.5:1.

After application to glass plates in a wet film thickness of 120 to 240 μm (which corresponds to a dry film thickness of 40 to 70 μm), the coating dried to "dust dry" in 30 to 60 minutes and to "tack-free" (completely dry) more than 8 to less than 24 hours to form a tough and hard film. After final curing (which took about 14 days at room temperature), the film had the following properties:

| | |
|---|---|
| Appearance (transparency/gloss) | Very good |
| Solvent resistance: | |
| White spirit: | Very good |
| Solvent naphtha 100: | Good |
| Methoxybutyl acetate: | Good |
| Acetone: | Moderate |
| Ethanol: | Good |
| Pendulum hardness (Albert/König): | 70–80 secs. |

When the coating composition was cured by stoving for 1 hour at 140° C., instead of curing at room temperature, the following properties were obtained:

| | |
|---|---|
| Appearance | Very good |
| Solvent resistance: | |
| White spirit: | Very good |
| Solvent naphtha 100: | Very good |
| Methoxypropyl acetate: | Very good |
| Acetone: | Moderate |
| Ethanol: | Good |
| Pendulum hardness: | 115–125 secs. |

Example 3

100 parts by weight of polymer dispersion 1 were carefully stirred with 0.2 part by weight of a commercially available foam inhibitor (Bevaloid 581 B, a product of Erbslöh, Düsseldorf) and 34.7 parts by weight of a commercially available pigment (Bayertitan R-KB-4, Bayer AG, Leverkusen) were added to the resulting mixture.

Using a dissolver, the pigment was dispersed in the mixture for 30 minutes at a rotational speed of 15 to 20 m/sec. Glass beads were added to the mixture to assist the dispersion process. After sieving and cooling, 4.04 parts by weight of a 5% by weight solution of a commercially available thickener (Acrysol RM 8, a product of Rohm and Haas, Frankfurt) were added to the mixture with stirring. A polyhydroxy component for a water-dilutable two-component white polyurethane coating composition having an almost unlimited storage stability was obtained in this way.

The addition of 46.4 parts by weight of Polyisocyanate 1 resulted in a water-dilutable, two-component polyurethane coating composition having the following composition:

| | |
|---|---|
| Polyacrylate resin, solid | 21.80% by weight |
| Additives | 0.22% by weight |
| Pigment | 18.73% by weight |
| Polyisocyanate 1 | 25.04% by weight |
| Total solids | 65.79% by weight |
| Water | 34.21% by weight |
| Total | 100.00% by weight |

If desired, the above-described mixture could be diluted with water to application consistency. Organic solvents are not necessary for this purpose. The mixture described above was free from organic solvents.

The ready-to-use coating composition was applied to glass plates in a wet film thickness of 200 μm (which corresponds to a dry film thickness of 60 to 70 μm). The dried film was glossy and free from defects. After 10 to 14 days, the curing process was complete. The properties of the coating composition and resulting film were as follows:

| | |
|---|---|
| Gel time: | >8 h |
| Initial drying (sand): | >8 < 14 h |
| Full drying (tack-free): | >8 < 24 h |
| Appearance (gloss) | Good |
| Pendulum hardness (Albert/König) | 70–80 secs. |
| Solvent resistance: | |
| White spirit: | Very good |
| Solvent naphtha 100: | Very good |
| Methoxybutyl acetate: | Very good |
| Acetone: | Very good–good |
| Ethanol: | Very good–good |
| Water resistance: | Good |

When the coating composition was aired at room temperature for 30 minutes and cured for 1 hour at 140° C., the following properties were obtained:

| | |
|---|---|
| Appearance: | Good |
| Pendulum hardness: | 100–110 secs. |
| Solvent resistance: | |
| White spirit: | Very good |
| Solvent naphtha 100: | Very good |
| Methoxybutyl acetate: | Very good |
| Acetone: | Good |
| Ethanol: | Good |
| Water resistance: | Good |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A water-borne coating composition containing a binder which comprises a mixture of
    (a) a polyol component which is dispersed in water or a water/solvent mixture and comprises at least one polymer prepared by the emulsion polymerization of olefinically unsaturated monomers and having a molecular weight (Mn) of 500 to 100,000, at least two alcoholic hydroxyl groups per molecule, a hydroxyl value of 15 to 250 mg KOH/g, an acid value of 0 to 7 mg KOH/g, and a total content of sulfonate and carboxylate groups of 0 to 4.5 milliequivalents per 100 g of solid resin and
    (b) a polyisocyanate component which is emulsified in the dispersion of polyol component (a), has a viscosity at 23° C. of 50 to 10,000 mPa·s and an average NCO functionality of 1.8 to 4.2, and contains 12.0 to 21.5% by weight of (cyclo)aliphatically bound isocyanate groups and 2 to 20% by weight of ethylene oxide units present within polyether chains, the polyether chains containing an average of 5 to 70 ethylene oxide units,
wherein the components are present in quantities corresponding to an equivalent ratio of isocyanate groups of component (b) to alcoholic hydroxyl groups of component (a) of 0.2:1 to 5:1.

2. The coating composition of claim 1 wherein said polymer has a total content of sulfonate and carboxylate groups of zero milliequivalents per 100 g of solid resin.

3. The coating composition of claim 1 wherein said polyol component (a) additionally comprises a positive amount of up to 10% by weight, based on the weight of said polyol component (a), of a water-soluble polyhydric alcohol having a molecular weight of 62 to 499, provided that the equivalent ratio of isocyanate groups of component (b) to all of the alcoholic hydroxyl groups of component (a) is 0.2:1 to 5:1.

4. The coating composition of claim 3 wherein said polymer has a total content of sulfonate and carboxylate groups of zero milliequivalents per 100 g of solid resin.

5. A process for the preparation of a coating composition which comprises
    (a) preparing a polymer having a molecular weight ($M_n$) of 500 to 100,000, at least two alcoholic hydroxyl groups per molecule, a hydroxyl value of 15 to 250 mg KOH/g, an acid value of 0 to 7 mg KOH/g, and a total content of sulfonate and carboxylate groups of 0 to 4.5 milliequivalents per 100 g of solid resin by the emulsion polymerization process from olefinically unsaturated monomers,
    (b) incorporating any auxiliaries and additives into the dispersion of polymer component (a), and
    (c) subsequently emulsifying a polyisocyanate component having a viscosity at 23° C. of 50 to 10,000 mPa·s and an average NCO functionality of 1.8 to 4.2 and containing 12.0 to 21.5% by weight of (cyclo)aliphatically bound isocyanate groups and 2 to 20% by weight of ethylene oxide units present within polyether chains, wherein the polyether chains contain an average of 5 to 70 ethylene oxide units, into the dispersion of polyol component (a),
wherein the components are present in quantities corresponding to an equivalent ratio of isocyanate groups of component (b) to alcoholic hydroxyl groups of component (a) of 0.2:1 to 5:1.

6. The process of claim 5 wherein said polymer has a total content of sulfonate and carboxylate groups of zero milliequivalents per 100 g of solid resin.

7. The process of claim 5 wherein said coating composition additionally comprises a positive amount of up to 10% by weight, based on the weight of said polymer, of a water-soluble polyhydric alcohol having a molecular weight of 62 to 499, provided that the equivalent ratio of isocyanate groups of component (b) to all of the alcoholic hydroxyl groups of said polyhydric alcohol and said polymer is 0.2:1 to 5:1.

8. The process of claim 7 wherein said polymer has a total content of sulfonate and carboxylate groups of zero milliequivalents per 100 g of solid resin.

9. A water-resistant substrate coated with the coating composition of claim 1.

* * * * *